United States Patent [19]

Davis

[11] 3,978,723
[45] Sept. 7, 1976

[54] WATER WHEEL ALL SEASON RAIN GAGE

[76] Inventor: James B. Davis, P.O. Box 5066, Santa Ana, Calif. 92704

[22] Filed: Nov. 10, 1975

[21] Appl. No.: 630,540

[52] U.S. Cl. ................................ 73/171
[51] Int. Cl.² .......................... G01W 1/14
[58] Field of Search ....................... 73/171

[56] References Cited
UNITED STATES PATENTS

| | | |
|---|---|---|
| 3,127,769 | 4/1964 | Stucky et al. ............ 73/171 |
| 3,243,999 | 4/1966 | Barker ..................... 73/171 |
| 3,393,559 | 7/1968 | Oviatt ...................... 73/171 |

FOREIGN PATENTS OR APPLICATIONS

| | | | |
|---|---|---|---|
| 244,791 | 5/1963 | Australia ................ | 73/171 |
| 44-10640 | 12/1966 | Japan .................... | 73/171 |

OTHER PUBLICATIONS

Mink et al., A Sensitive Tipping-Bucket Rain Gauge, Rev. of Sci. Inst., vol. 45, No. 10 (Oct. 1974) pp. 1268-1270.

Primary Examiner—Richard C. Queisser
Assistant Examiner—Anthony V. Ciarlante

[57] ABSTRACT

This invention relates to an improved rain gage based on the old method of the hydraulic water wheel used for power, for centuries, except this is a small precision made water wheel that moves constantly during rainfall in a variation of movement of light to heavy rainfall. The shaft of the water wheel drives three dials of 0 to 1, 1 to 10, 10 to 100 inches, using a knocker system without resetting the dials.

6 Claims, 8 Drawing Figures

WATER WHEEL ALL SEASON RAIN GAGE

BACKGROUND OF INVENTION

This rain gage has been designed and built with all hazards of natural and unnatural conditions to affect its efficiency from such insects as spiders, wasps, yellow jackets that invade such units; also birds, and high velocity winds that could move or jam the working parts. All the moving parts are water lubricated the moment of the first moisture to fall. This prevents any drag from dry bearings that would cause a variation in the revolutions. I have made many tests for accuracy of a very light mist to heavy rainfall. The variation was less than 0.01%. Any rain gage that is exposed to the elements for months must have this built-in protection to achieve accuracy.

DESCRIPTION OF COMPONENTS

Figure 1:
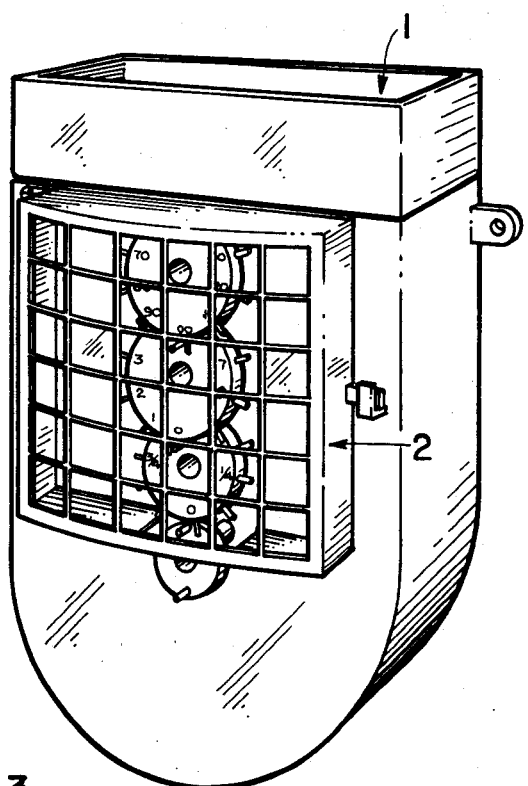
FIG. 1 is a slight angle view of the complete unit.

FIG. 1 shows an angle front view of the unit. It will record 100 inches without re-setting dials; a 9 inches precision made water wheel 2¼ inches wide, with 24 troughs 1¼ inches deep, turn the dials that record the rainfall. The housing measures 3 × 10 inches on top and 14 inches deep to bottom center. Top section contains a funnel-like trough that has an outlet of 1 × ⅜inch. This concentrates the rainfall 2 inches to the left of top center of water wheel. The outlet on the bottom center is ½ inch × 3 inches. Both the in and outlet are screened with 16 mesh brass screen to keep all insects from hiving or nesting in unit. The bearings of water shaft and dials are slotted to take in moisture for water lubrication. Test model was made of aluminum with copper bearings. If produced for sale, they will be of hard plastic. This rain gage was tested by me under simulated rainfall of light, medium and heavy rains. I used a tube type gage alongside this gage to test for accuracy and to arrive at the gear ratio needed for the dials after much testing. Accuracy was amazing. In FIG. 1, 1 shows the top of trough that takes in rainfall. 2 shows the hinged screen cage to protect the dials.

Figure 2:
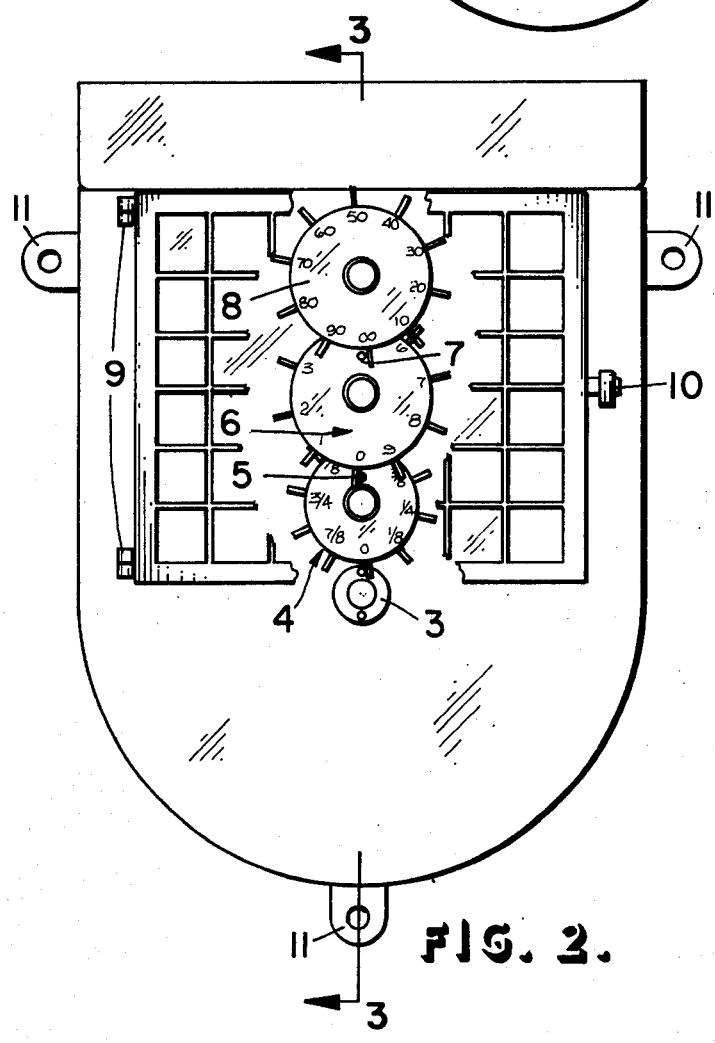
FIG. 2 is a front view with a cut-away view of the protection cage that protects the three dials that register 1 inch to 100 inches.

FIG. 2 shows a front view of unit drive showing the 1¼ inch flange, with two knockers on a ½ inch shaft of water wheel. These strike a 2 inch dial 0–1 inch 16 times for each 1 inch of rainfall. One knocker on this dial strikes the peg on the 2½ inch dial of 1 – 10 inch and the knocker on this dial will strike the 2½ inch dial of 10 – 100 inches. Each revolution will be 10 inches of rainfall. The shafts for the dials are ½ inch. There is an error in the drawing of 0 – 1 inch dial. It shows ten striker pegs instead of sixteen. There is a hinged plastic screen cover of ¼ inch frame with ⅛ inch crossbars of ¾ inch mesh. This will open to set or re-set the dials. This screen is to keep birds from perching on the dials.

FIG. 2, 3 shows the two pegged knocker flange attached to shaft of water wheel; 4 shows 0 to 1 inch dial with pegs, that are struck twice for each revolution of water wheel. 5 shows single peg, that strikes the second dial once for each revolution. 6 shows the dial of 1 to 10 inches that is moved by the knocker peg. 7 shows single peg that strikes the 10 to 100 inch dial. 8 shows dial of 10 to 100 inches that is moved by strikes of second dial. 9 shows hinges on screen cage. 10 shows lock on cage to open for resetting dials. 11 shows brackets for mounting.

Figure 3:
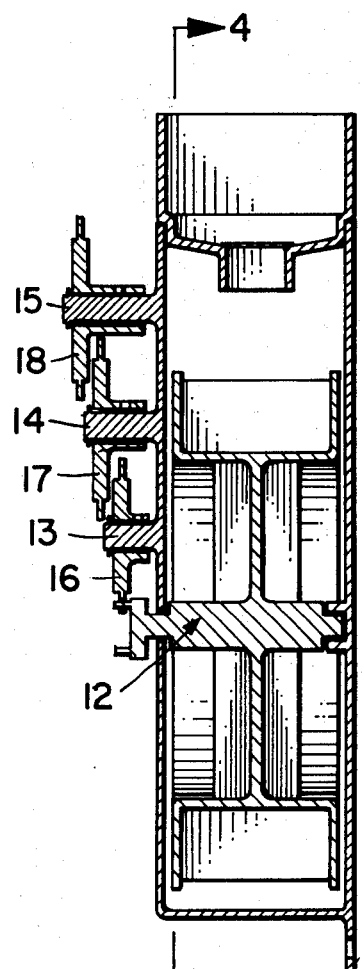
FIG. 3 shows a side view of one-half section, cut away, exposing method of drive and recording dials.

FIG. 3 is a cut-away side view showing the midsection of all the working parts, also the top funnel and outlet.

FIG. 3, 12 shows shaft of water wheel. 13, 14 and 15 show shafts that are attached to housing for the dials to rotation. 16, 17 and 18 show sleeve mounted dials.

Figure 4:
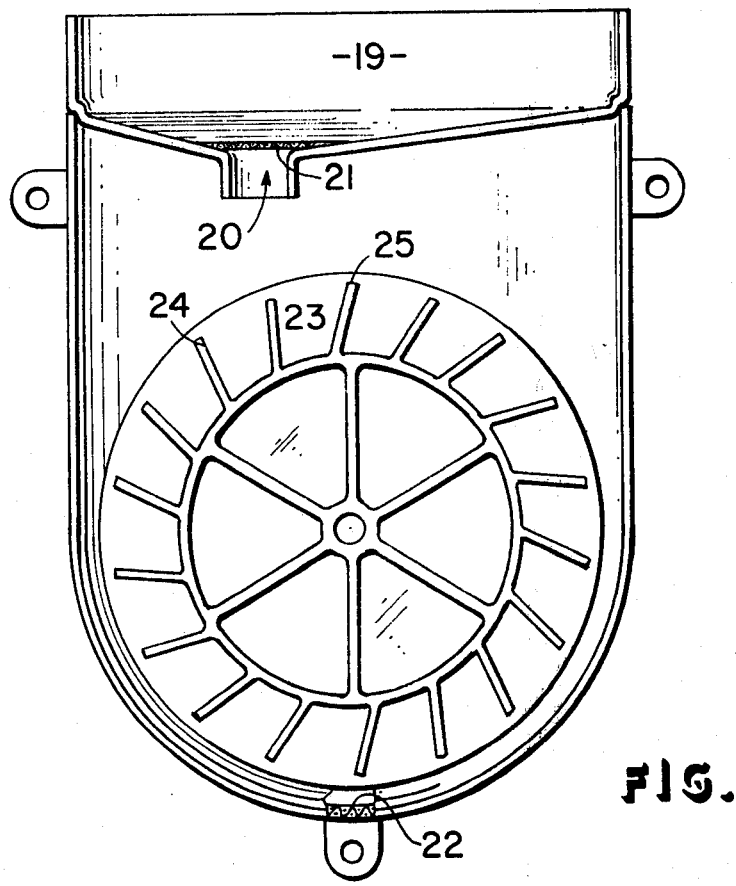
FIG. 4 shows view cut cut away, exposing the back half of trough and funnel that concentrates the water, two inches to the left of center of the exposed water wheel and also shows an outlet slot at the bottom.

FIG. 4 shows cut-away front view of the funnel-like top that concentrates the rainfall 2 inches to left of center of water wheel. It also shows the partitions of the troughs ⅛ inch lower than the outer flanges of the water wheel. This keeps the water spilling into each trough, so that the weight of all the water is measured. The troughs have 15° slant up from the horizontal center of the wheel, thus maintaining some water to 15° below horizontal center. It also shows the outlet at bottom. There is an error in the number of troughs in this drawing. 24 is correct.

FIG. 4, 19 shows trough for water collection. 20 shows water spout that concentrates the water two inches to the left of center of water wheel. 21 shows brass screen of 24 mesh. 22 shows outlet slot with screen. 23 shows water tight partitions. 24 shows angle of partitions. 25 shows flanges of water wheel to extend beyond the partitions.

Figure 5:
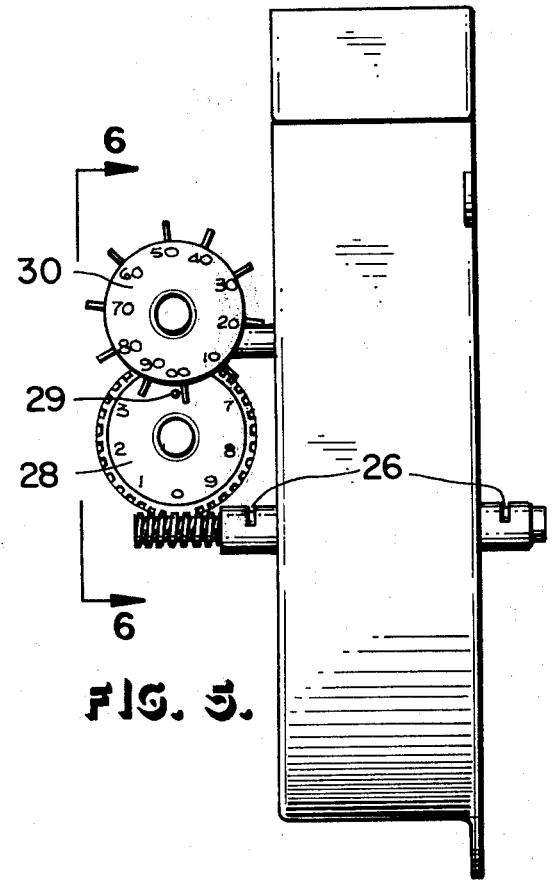
FIG. 5 shows another method for power take-off, using a worm gear driven dial from 0 to 10, with knocker, that moves the second dial, of 10 to 100 inches. If this method proves more durable than the three knocker dials, it may be used.

FIG. 5 shows another method for power take-off to drive the dials that register the rainfall. That is a worm gear driven dial of 2⅛ inches with 80 teeth driven from wheel shaft of ½ inch that has 12 threads per 1 inch. This dial registers 0 – 10 inch with a knocker that strikes No. 2 dial 10 – 100 inches each revolution. These dials face to the right side of the unit. Both dials turn on ½ inch shafts; ½ inch shaft from unit housing goes into sleeve on the two-dial unit. This serves for two purposes: for tilting, to re-set dials and allow the weight of the two dials and the component, to make a constant mesh of the worm drive. This drawing also shows slots in bearings for water moisture lubrication. Both the knocker method and the worm gear are accurate. It depends on the durability and convenience to the user and in manufacturing of what type will be used the most.

Figure 6:
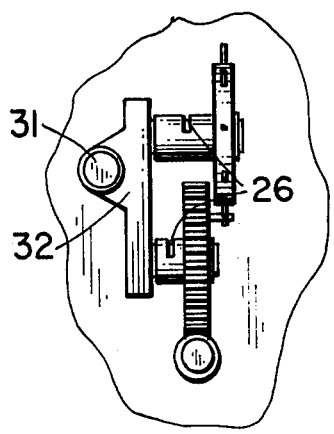
FIG. 6 shows a side view of the worm gear knocker combination, showing the component and the shaft that protrudes from the housing for tilting in order to set or reset dials and shows how the pressure from the weight of the component is used to enmesh the worm gear.

FIG. 5, 26 shows slots in bearings for water lubrication. 27 shows worm gear drive. 28 shows worm driven dial of 0 to 10 inches. 29 shows a single peg for striking second dial. 30 shows dial of 10 to 100 inches with knocker pegs. FIG. 6. A side view of the worm gear knocker combination showing the component that has two ½ inch shafts protruding for dial sleeves to rotate on; also, end of shaft that protrudes from housing, for tilting, to set or re-set, and the pressure from the weight of the unit to enmesh the worm gear.

FIG. 6, 31 shows end of shaft that protrudes from housing. 32 shows sleeve of component that tilts for resetting and also allows the weight of the component to enmesh the worm drive.

Figure 7:
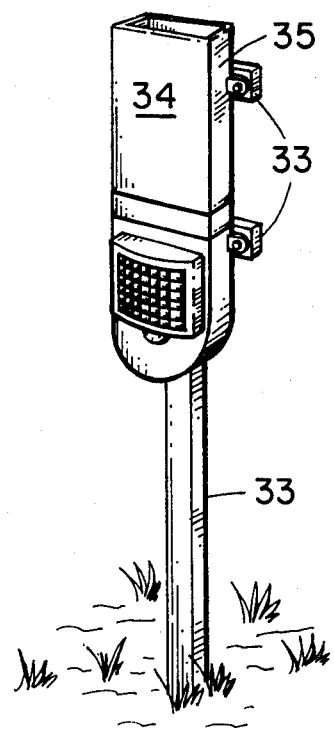
FIG. 7 shows the rain gage, with an optional snow tube section attached, mounted on a 3 × 4 wood post with cross pieces to attach the bracket. The cross pieces and top of post are two inches below top of trough so that no raindrop bounce will enter rain gage.

FIG. 7 shows the Water Wheel All Season Rain Gage with optional show tube section attached. Mounted on a 3 ×0 4 wood post with cross pieces to attach the brackets. The cross pieces, or end of post, should be a minimum of 2 inches below the top of funnel so as not to create raindrop bounce that would enter Gage. Bottom gage should be 5½ feet from ground to prevent livestock from nosing and small children turning dials and located away from buildings or trees where the sun could shine on it on the clear days to melt the snow.

FIG. 7 33 shows 3 × 4 post with cross pieces for mounting gage. 34 shows a snow tube mounted on top. 35 shows post and cross piece 2 inches below trough to eliminate raindrop bounce that could enter the gage.

Figure 8:
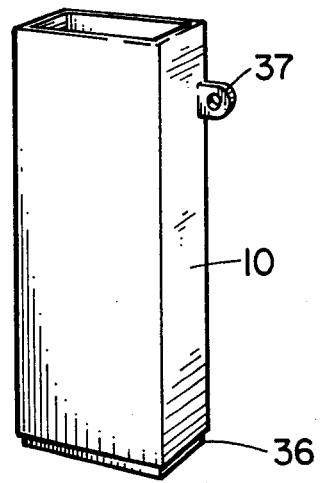
FIG. 8 shows an optional snow tube that may be used in cold climates to measure snow moisture as well as rainfall.

FIG. 8 shows an optional rectangular tube 3 × 10 inches and 24 inches long with bottom having an offset ¾ inch long to enter gage housing with two brackets 4 inches from top, to attach to crossbar. This would measure the moisture contents in the snowfall. When the sun warms the unit up and the snow melts, the gage would tell the farmer how many inches of moisture that has entered the soil for spring and summer crops. This should be desirable for the dryland farmers of grain, corn and livestock.

FIG. 8 drawing show optional snow tube 10. 36 shows the recess that slips into rain gage trough. 37 shows mounting brackets.

I claim:

1. A gage for measuring atmospheric precipitation comprising: a trough having an inlet for collecting atmospheric precipitation and an outlet for discharging said precipitation, a water wheel driven by said discharged precipitation, a plurality of dial indicators rotated by said water wheel and slotted sleeve bearings used to mount said wheel and said indicators thereby providing lubrication by said precipitation resulting in uniform friction over an extended period.

2. The gage of claim 1 further comprising a flange rotated by said water wheel and containing a peg mounted thereon, said dials comprising a first and second dial each having a peg mounted thereon and a third dial, whereby said flange rotates said first dial, said first dial rotates said second dial and said second dial rotates said third dial.

3. The gage of claim 1 further comprising a hinged screen cover used to protect said dials from birds and blowing debris.

4. The gage of claim 1 further comprising a housing enclosing said water wheel, said housing containing an inlet defined by said trough and an outlet, said inlet and outlet each containing a screen, thereby preventing insects from hiving or nesting inside said housing.

5. The gage of claim 1 further comprising a worm gear driven by said water wheel, said dials comprising a first dial driven by said gear, a peg mounted on said first dial and a second dial driven by said peg.

6. The gage of claim 1 further comprising an optional snow tube connected to said trough, thereby providing a means for collecting snow resulting in rotation of said water wheel upon thawing of said snow.

* * * * *